United States Patent [19]

Wajsbrot et al.

[11] Patent Number: 5,225,139
[45] Date of Patent: Jul. 6, 1993

[54] PROCESS FOR THE MANUFACTURING OF A MECHANICALLY CONDITIONED THERMOPLASTIC FILM WITH BIAXIALLY RECOVERABLE STRESSES

[75] Inventors: Jacob Wajsbrot; Flavio Derdyk; Rafael L. Echavarria Estevez, all of Sao Paulo, Brazil

[73] Assignee: Plasticos Polyfilm S.A., Sao Paulo, Brazil

[21] Appl. No.: 730,127

[22] Filed: Jul. 15, 1991

Related U.S. Application Data

[63] Continuation-in-part of Ser. No. 428,370, Oct. 27, 1989, abandoned.

[51] Int. Cl.⁵ .............................................. B29C 55/28
[52] U.S. Cl. .................................... 264/514; 264/557; 264/558; 264/559; 264/560; 264/562; 264/566; 264/570; 264/288.8; 264/289.6; 264/290.2; 264/342 RE
[58] Field of Search ............... 264/557–563, 264/514, 570, 566, 500, 555, 290.2, 289.6, 209.1, 288.8, 209.5, 342 RE; 425/71, 326.1

[56] References Cited

U.S. PATENT DOCUMENTS

| | | | |
|---|---|---|---|
| 2,337,927 | 12/1943 | Reichel | 425/326.1 |
| 2,804,642 | 9/1957 | Milne | 425/71 |
| 2,897,547 | 8/1959 | Weingand | 264/561 |
| 2,979,777 | 4/1961 | Goldman | 264/562 |
| 3,340,338 | 9/1967 | Meissner | 425/71 |
| 3,426,113 | 2/1969 | Yazawa | 264/40.3 |
| 3,822,333 | 7/1974 | Haruta et al. | 264/209.1 |

FOREIGN PATENT DOCUMENTS

| | | | |
|---|---|---|---|
| 2372688 | 8/1978 | France | 264/558 |
| 45-30230 | 9/1970 | Japan | 264/557 |
| 49-12898 | 3/1974 | Japan | 264/290.2 |
| 54-73874 | 6/1979 | Japan | 264/557 |

Primary Examiner—Jeffery Thurlow
Attorney, Agent, or Firm—Abelman Frayne & Schwab

[57] ABSTRACT

A process of expanding plastics film is disclosed, together with an apparatus for performing that process, in which expansion of the plastics film is performed under the control of a liquid providing a stable hydraulic mass, by the downward extrusion and drawing of the plastics film, and the final expansion thereof, exclusively under the influence of the static and dynamic pressure of a hydraulic mass, at a position spaced downwardly of the extrusion head, the hydraulic mass being one that remains in a liquid phase at all temperatures encountered during the step of lateral stretching of the plastics film, to the exclusion of vaporization of the hydraulic mass.

17 Claims, 4 Drawing Sheets

PROCESS FOR THE MANUFACTURING OF A MECHANICALLY CONDITIONED THERMOPLASTIC FILM WITH BIAXIALLY RECOVERABLE STRESSES

This Application is a continuation of U.S. application Ser. No. 07/428,370 now abandoned, filed Oct. 27, 1989.

SUMMARY OF THE INVENTION

This invention relates in particular to a process of producing stretched plastics film, which can either be mono-axially stretched, or, as is more common, bi-axially stretched.

The invention has equal application to the formation of a single thickness of stretched plastics material, and to stretched plastics material having multiple layers of characteristics different one from the other to provide a multiple layered stretched plastics film simulating a laminate, the respective layers each having a particular characteristic as demanded by the specific application in which the plastics film is to be employed. The plastics material used in the formation of the stretched film is provided by extrusion or coextrusion in tubular form in a continuous operation.

Typical of such applications are composite plastic films for use in the food packaging industries, particularly in the packaging of cheese and raw or cooked meats and poultry; thermo-shrinkable composite plastics films as used in the general packaging industries; the formation of bags of high strength and resistance to tearing; the formation of high strength packaging tapes, etc.

DESCRIPTION OF THE PRIOR ART

The commonly known process of producing expanded plastics film involves the production of a parison of the plastics material to be expanded in the form of a hollow cylinder by the employment of a conventional extrusion or coextrusion die, and then, the introduction of air under pressure into the interior of the hollow cylinder of plastics material to expand the cylinder radially outwardly of its longitudinal axis to produce a blown cylinder of desired wall thickness.

The air blowing of plastics film is encumbered with many complications, which makes it extremely difficult to predict and control the wall thickness of the blown plastics film.

Such variables include the temperature of the extrusion or coextrusion die, the characteristics of the plastics material being extruded, the temperature, pressure, density and humidity of the compressed air used in the blowing operation, as further complicated by ambient temperature, pressure, density and humidity in the plant in which the blowing operation is performed, and changes in ambient temperature, pressure, density and humidity of the ambient that occur during a production run of the blown material.

Each of these variables can affect the thickness of the finished blown film product as well as its appearance, such as wrinkles, and, the physical characteristics of the packaging material formed therefrom. Moreover, the processing conditions are difficult to control in order to maintain a continuous and stable production run when using the compressed air bubble blowing technique.

SUMMARY OF THE INVENTION

The present invention teaches a process of producing expanded plastics film in a manner far more predictable than that obtainable by air blowing of the film, and, which is far more accurately controllable than conventional air blowing procedures, the invention having for its object to eliminate numerous vagaries that adversely affect the formation of plastics film by air blowing procedures.

According to the present invention, the expansion of the plastics film is effected exclusively under the influence of the static and dynamic hydraulic pressure of a liquid material providing a stable hydraulic mass of controlled weight, temperature, and viscosity that is trapped within the hollow cylinder of plastics material, and, which is operative to impose a radially outwardly acting tensile hoop stress in the plastics material as it progressively traverses the hydraulic mass in a downwards direction to effect the required transverse stretching of the film, the mass of liquid material being one that remains in the liquid phase at all temperatures encountered during the step of lateral stretching of the hollow cylinder, to the exclusion of vaporization of the hydraulic mass.

The hydraulic mass can be comprised of any liquid suited to the particular plastics material that is to be stretched. Typical of such liquids are water, admixtures of water and water soluble substances such as metallic salts, alcohol, glycerol, viscosity enhancers and the like, as dependent on the particular plastics material to be formed into a film.

Such a hydraulic mass is readily controllable in respect of its weight, and is essentially immune to ambient air changes. Also, it can be closely controlled in its temperature and mass for it to exert an outward stretching force on the film that is constant throughout a production run of the stretched film.

Additionally, the liquid hydraulic mass provides a constant force against which the drawing rollers operate, thus allowing accurate axial stretching of the film during its production, and following an accurate forecast to be made of the axial and transverse stretching of the film in the production of the bi-axially stressed film.

According to the present invention, a continuous hollow cylindrical tube or parison of plastics material, or a plurality of such continuous hollow cylindrical tubes arranged coaxially of each other, is produced in an extrusion or coextrusion die positioned above the work area. The die is inverted such that the extruded tubes pass vertically downwardly from the extrusion or coextrusion die. In the event that multiple extruded tubes in coaxial relation are to be employed in the process, then, as is well known in the art, portions of the die portions employed for forming those tubes can be counter rotated about their longitudinal axis.

Immediately upon emerging from the extrusion or coextrusion die, the tubes are cooled by a flow of forced air to "set" the tubes at the diameter of the associated extrusion or coextrusion die, in order to minimize elongation and inward collapsing of the tubes under gravitational forces.

The tube or the composite array of concentrically arranged tubes is then passed through a cooling device in which the tubes are chilled to above the glass transition temperature of the plastics material from which they are formed in order that the respective tubes each are at that time amorphous and substantially devoid of crystallinity.

The tube or assemblage of tubes is then passed downwardly between the nip of a pair of driven pinch rollers, and is then passed vertically downwardly between the nip of a second pair of pinch rollers, which also are driven, but at a speed greater than that of the upper pair of pinch rollers, in order to effect axial stretching of the tube.

A liquid hydraulic mass is then introduced into the interior of the tube or the composite tube through a center opening in the extrusion die, the upper pair of pinch rolls at this time being retracted such that the liquid hydraulic mass can pass downwardly within the tube for it to collect above the nip of the second pinch rolls.

As the height of the liquid hydraulic mass progressively increases, so do the radially outwardly acting forces in the interior of the tube wall increase to commence stretching of the tube in directions radially of the longitudinal axis of the tube. The introduction of more of the liquid hydraulic mass into the tube will increase the radial expansion of the tube until such time as the required diameter of the stretched tube is accomplished.

At this point in the process, the upper pair of pinch rollers is again brought into engagement with the tube, and, the respective pairs of upper and lower pinch rolls are then driven to cause the tube to traverse vertically downwardly between the nip of the upper pinch rolls and that of the lower pinch rolls.

The liquid hydraulic mass at this time is completely contained within the interior of the tube, and, is prevented from leaking from the expanded lower end of the tube by the closure force exerted on the tube by the lower pinch rollers.

There also exists the opportunity of producing films of graduated thickness in directions laterally of the longitudinal axis of the tubes by displacing the upper pair of pinch rolls laterally with respect to the lower pair of pinch rolls, such that the axis of the tube at locations between the respective pairs of pinch rolls is inclined to the vertical. So doing will provide greater hydrostatic pressure on one side of the tube or tubes of plastics material than on the other, this resulting in greater expansion of the tubes to one side of the longitudinal axis than on the other.

As is common in the art, the respective upper and lower pinch rolls are driven at speeds different from each other in order to provide axial stressing in the formed plastic film in order to provide a bi-axially stressed film.

The presence of the liquid hydraulic mass, by virtue of its substantial weight and very substantial thermal inertia, has the effect of minimizing or eliminating those problems that arise in air blowing of the film and which are due to changes in pressure, temperature, density and humidity of the blowing air and the ambient air. Also, the hydraulic mass provides a flexible buffer acting to maintain axial stretching forces exerted on the tube constant throughout the production run.

Plastics material is transparent to infrared light. Thus, the opportunity exists of temperature controlling the liquid hydraulic mass to maintain it at any selected temperature during the stretching operation.

At the lower pair of pinch rolls the plastic tubing itself acts as a seal preventing leakage of the liquid hydraulic mass downwardly between the lower pinch rollers. The lower pinch rolls act to squeeze any of the liquid hydraulic mass that is attempting to pass the lower pinch rolls upwardly and back into the main body of the liquid hydraulic mass.

Additionally, and to great advantage, the downwards axial movement of the film of plastics material during the stretching operation will produce eddy currents in the hydraulic mass, which will act to maintain the temperature gradient of the hydraulic mass constant throughout the entire body of the mass by causing a continuous intermixing of the entire body of the hydraulic mass.

Minor amounts of the liquid hydraulic mass that have wet the inner surface of the tube of plastics material possibly will pass with the expanded plastics film through the nip of the lower pinch rolls. Such an amount is extremely small, and, represents such a small fraction of the total volume of the hydraulic mass as to be of no significance during a production run. Further, any such loss in the liquid hydraulic mass can be compensated by introducing a corresponding volume of liquid through the upper pinch rolls as the film stretching operation proceeds.

Any wetting of the formed stretched film can be dried out subsequent to the stretching operation by slitting the film and passing it through dry air drying chambers. Alternatively, one or more of the inner layers of the tube in a composite tube can be selected from materials that are hydrophilic and provide a minor amount of absorbency to any remaining moisture that has not been squeezed out by the lower pinch rolls.

The present application has particular application to the formation of thermoplastics film that is to be bi-axially oriented by stretching, including the extrusion or coextrusion of the film in continuous tubular form, which, in turn, may have only one layer, or multiple layers.

As known by those versed in this technique, biaxial mechanical orientation is a process in which the thermoplastic film is stretched so as to orient the plastic polymer chain in parallel to the film plane, i.e., the molecular orientation during drawing or stretching takes place in the following manner: Below their glass transition temperature (Tg), polymer chains are rigid. At the glass-transition temperature, (Tg), they become more flexible and are able to unfold while a stretching force is applied. If a mass of randomly coiled and entangled chains is above Tg when force is applied, as in biaxially stretching, the polymer chains disentangle, unfold and straighten, and also slip past their nearest neighbor.

There are three rheological components to this process:

1) INSTANTANEOUS ELASTIC DEFORMATION:

When submitted to a small tensile stress, the sample acquires a very slight reversible elastic deformation which is completely recoverable when the stress is released.

2) MECHANICALLY CONDITIONED RECOVERABLE ELASTIC DEFORMATION:

Caused by the molecular alignment parallel to the deformation stress direction which is frozen into the structure when the material is cooled. Such dimensional change is reversible when again submitted to the action of temperature.

3) IRREVERSIBLE VISCO-ELASTIC DEFORMATION:

In case the conditioning stretching stress exceeds a subsequent "unrecoverable" deformation rate, the film is mechanically conditioned to the new and higher stress level.

The recoverable elastic deformation is the main factor causing the biaxial stretching process.

Some polymers are able to crystallize and others are not. This depends on countless factors, an all-important factor being the crystal regularity.

As a general rule, a perfectly repeating chain as, e.g., polyethylene, may be organized into a crystalline grid, while a chain formed by a random sequence of several different units may not crystallize as, e.g., polyesters.

When a polymer is crystallize from the molten material by cooling, the final resulting specific gravity is always intermediate between the specific gravity at the amorphous state and the theoretical density of a perfect crystal. Thus, a polymer is obtained with many crystallites and amorphous regions. The result is a polycrystalline mass which normally contains amorphous material. At sufficiently high temperatures, a linear polymer is an amorphous material.

The chains are randomly interpenetrating skeins, readily twisting from one conformation to another.

At sufficiently low temperatures, the same polymer is a hard and rigid solid. There are two mechanisms through which a polymer may solidify by cooling: it may crystallize or vitrify. In some polymers, crystallization is the most important process; in others, only vitrification is found. The physical properties used to characterize a polymer are the crystalline material melt point (Tf) and the glass transition temperature (Tg).

The crystalline melt point and the glass transition temperature of a polymer depend on the chain flexibility and on the values of the intermolecular forces.

A random polymer generally is more difficult to be disposed in a crystalline grid, as compared to polymers with perfectly repeating chains.

As an example, the melt point of crystalline polyethylene is of approximately 137° degrees Celsius. The glass transition temperature is lower than ambient temperature, at about −35° degrees Celsius.

At ambient temperature, linear polyethylene is very crystalline; however, it is not brittle, since a small fraction of the intercrystalline amorphous material is flexible.

Thus, oriented crystalline polymers undergo dimensional changes when submitted to temperature changes between the glass-transition temperature and the crystalline melt temperature. Therefore, the oriented thermoplastic film shrinks when temperature increases, releasing stresses, characterizing a reversible change.

The prior orientation history at certain temperature and stresses define the crystallite orientation model, establishing a thermal conditioning and a mechanical conditioning.

The mechanical performance of a polymer going through the transition from the amorphous state to the crystalline state during deformation is too complex to be reduced to a simple formula relating stress to deformation.

In view of the above, and considering that in many cases it is desirable to confer some mono or biaxial orientation degree to plastic films, the following aspects may be pointed out for an efficient stretching - The maximum orientation degree which will provide the largest contraction is obtained as near as possible to the glass-transition temperature (Tg), however, above this temperature.

The largest contraction will be obtained with the maximum longitudinal and/or transversal stretching rate.

The largest quenching as the parison or tube emerges from the die will produce minimum crystallization and, thus, a plastics material as amorphous as possible.

Based on these concepts and rules, as well as on the characteristics inherent to each thermoplastic to be worked, there are presently many processes especially developed for axial and biaxial orientation of plastic films with tubular shape; however, in most cases, the existing processes generally show the same basic operating principles.

Most polymers used for the manufacturing of shrinkable films are crystallized polymers.

In order to obtain an extrusion-orientable film, crystalline polymers are to have a minimum amount of crystallinity. Thus, the extruded tube temperature must be reduced below the crystallization temperature as quickly as is possible to inhibit crystal growth.

The material in the almost amorphous state is then reheated to a temperature as low as possible, however higher than Tg, in order to then be very quickly biaxially stretched so as to avoid crystal growth.

In most existing processes, biaxial stretching is performed through an air bubble controlled by mechanical devices existing in the equipment performing the production process of the thermally-shrinkable plastic, as shown in the schematic of FIG. 1, which depicts a basic equipment normally used to biaxially orient a seamless thermoplastic tube. This figure shows an extruder (A) whose die may be designed for the production of a plastic film in the format of a continuous seamless tube (B) with one or more layers; however, independently of such aspects, the produced thermoplastic tube goes through several processing steps until it is biaxially oriented, the first one consisting in applying a cooling (C) for the produced plastic tube to reach a temperature slightly below the crystallization temperature. As previously mentioned, the highest rate of shrink is obtained with the lowest practical temperature above Tg. In this phase, a quantity of air or gas is kept inside the extruded tube, forming there a first bubble (D), which is retained by a first roller pair (R1), the latter collapsing said tube walls. In this process step, the bubble operates as a diameter stabilizer for the tube to be biaxially oriented. This first bubble is generally formed in order to obtain a better control of the produced film. After the first roller pair (R1) the produced tube is again blown up with the help of a second roller pair (R2); however, in this case it is also submitted to a controlled heating (E), enabling it to reach a temperature, known as the orientation temperature and which is always below the crystalline melting point, suitable for biaxial stretching, i.e., as near as possible to the crystallization temperature, however lower than the latter. Immediately after this preheating, the tube may be readily stressed in order to obtain a film which is oriented both in the machine direction and in the transversal direction. Stressing or stretching in the longitudinal direction or machine direction is obtained through different rotation speeds applied to the rollers (R1 and R2), so as to obtain a desired stretching between them. Distention or radial stretching (machine transversal direction) is obtained through the air or gas internal pressure itself.

In all known processes for the production of a biaxially oriented tubular film, it may be noticed that generally the material is cooled and then the almost amorphous material is reheated for it to reach a temperature as near as possible to the crystallization temperature as, at this temperature range, the known processes enables biaxial stretching of the film in process; however, the best procedure would be to work with a material as amorphous as possible at a temperature as low as possible from the crystalline melting point and, as near as possible to its glass-transition temperature Tg. However, this in fact does not occur as described above simply due to the fact that the material at a temperature near the crystallization one is more easily worked on as a function of the used processes. However, this ease is very limited, since the biaxial stretching through a bubble and reheating is translated into a series of technical and practical inconveniences, i.e., it is extremely difficult to control the characteristics of the formed bubble itself and of the thermoplastic tube in process, inasmuch as the gas used (air) is highly compressible, rendering difficult the pressure control and consequently also rendering difficult the stretching dimensional control in the machine transversal or longitudinal direction, with problems also regarding the bubble thermal uniformity, as the air contained in it is always moving (convection) and, of course, it is very difficult to heat the air mass to a uniform temperature. This also causes a subsequent contraction irregularity of the film when submitted to heat. These and other factors act jointly for the stretched material to show thickness irregularities in its walls, also resulting in significantly important faults in case the film is thermo-shrinkable, being the cause of tears or of the opposite effect, i.e., the film does not fit accurately on the product to be packaged. Thus, several of the processing variables are vary critical and difficult to control in the production of a uniform product.

In view of the above circumstances and in order to overcome them, this process was created and especially designed for the characterization of specific improvements, not only referring to the process itself, but also referring to the characteristics and final quality of the biaxially stretched film.

This process was developed in order to enable an accurate mono or biaxial stretching resulting in a smaller operational and investment cost, and obtaining maximum technical benefits. For this purpose, a special process was developed, characterized by a descending vertical process completely different from those described previously, i.e., from the start, the first modification is introduced immediately after the material extrusion, in one or more layers, since, as already mentioned, the material may be extruded in one or more layers (monoextruded or coextruded), where each layer is defined by a film with its own characteristics and, thus, the layer assembly enables a single product (plastic film) to absorb or combine the characteristics of different plastic materials. In this first modification of the process, the monoextruded or coextruded tube is quenched immediately after coming out of the die, through a special cooling liquid circuit at a suitable temperature, sufficient to make the extruded tube almost completely amorphous, with a minimum possible amount of crystallinity. The sole objective of this first modification is of course to obtain an amorphous polymer. The amorphous material in tubular form is then flattened and led to pass through a series of roller pairs, when passing through two of them, the vertical tube receives a certain quantity of liquid, forming there a controllable hydraulic mass. This hydraulic mass, as already mentioned, is retained vertically between two roller pairs, whose distance may be adjusted; the two roller pairs are driven by suitable mechanical devices and each pair may even turn at a different speed in relation to the other.

Thus, said controllable hydraulic mass represents the main agent of the forces to be produced in order to perform a hydro-stretching or hydro-orientation of the plastic tube in process. Due to being a hydraulic mass, its control is substantially easier and more precise and the control of the air bubble, i.e., in the first place the weight of the hydraulic Mass produces the forces required for the stretching in the direction transversal to the machine, while stretching in the machine direction is performed through different speeds applied to the two roller pairs which retain the hydraulic mass and which, in turn, may also be subjected to influences when the speed of the plastic tube in process is increased or reduced. The hydraulic mass shows a friction coefficient between its portions and the tube itself and, thus, differently from gases, which tend to disorderly spread out occupying the entire area where they are retained, the hydraulic mass is forced against or over the lower roller pair and, at this point, a divergent forces effect is produced, i.e., the higher the descending speed of the plastic tube, the larger will be the pressure of the hydraulic mass on the lower roller pair, where the formed barrier causes a regular and uniform expansion of the base of the hydraulic mass causing the plastic tube stretching, and thus characterizing a suitable biorientation of said tube, both in the machine direction and in the transversal direction. Also, the hydrostretching is performed at low temperature, thus not requiring, as is the case for other invention patents, bubble preheating or reheating for subsequent biaxial stretching.

As previously explained, the best orientation efficiency occurs between the crystalline melting temperature and the glass temperature, especially as near as possible to the latter. Therefore, this process causes hydro-orientation at low temperature, keeping the polymer amorphous with a minimum possible amount of crystallinity, differing from the known conventional processes.

Thus, it may be noticed that the objective of the present process is to define means for the biaxial orientation to be performed through a hydraulic mass perfectly controllable in all directions, so that during the process, and equally accurate control may be obtained of the stretched material, mainly referring to the wall thickness, uniformity and accuracy of the thermoplastic tube stretching rate.

BRIEF DESCRIPTION OF THE DRAWINGS

The invention will now be described with reference to the accompanying drawings, in which.

DESCRIPTION OF THE PRIOR ART

Figure 1:
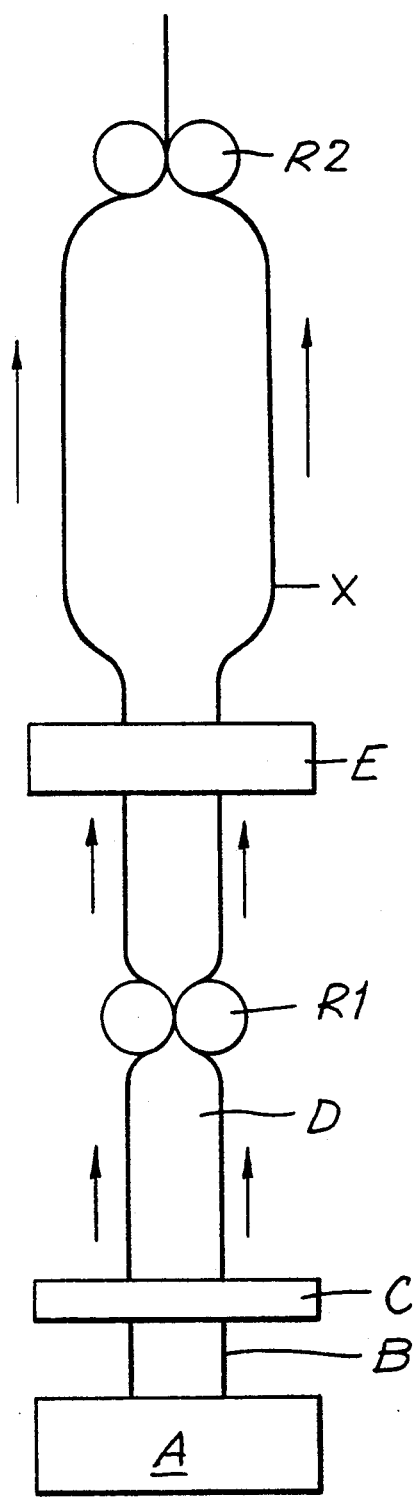
FIG. 1 is a diagrammatic illustration of the prior art method and apparatus of stretching plastic film.

Referring now to FIG. 1, an extrusion die A is floor mounted, and extrudes a cylinder of plastics material in an upwards direction for it to pass through an annular temperature conditioning device C, and then passes upwardly between a lower pair of pinch rollers R1. The hollow tube of thermoplastics material then continues in a vertically upward direction through a further temperature conditioning apparatus E, subsequent to which it is blown by heated compressed air to stretch it in lateral directions to provide a bubble of stretched plastics film X. The bubble of stretched plastics film X then continues vertically upwardly into the nip of a pair of pinch rollers R2 arranged at the top of the apparatus, in which it is flattened into planar form. The stretch plastics material emerging from the pinch rollers R2 is then split and reeled for subsequent use.

As has been previously explained, numerous factors can affect the accuracy of stretching of the plastics film bubble X, such variables including variables in the temperature, pressure, density and humidity of the blowing air, and also, the temperature, pressure, density and humidity of the ambient air, and changes therein which will occur during a production run. Further, the stretched plastics film bubble, which is extremely light and flexible is prone to wrinkling variations in its wall thickness or flatness, and bubble instability if exposed to drafts, which would cause the vertical center line of the bubble to be displaced laterally of its intended vertical center line.

DESCRIPTION OF THE PREFERRED EMBODIMENT

Figure 2:
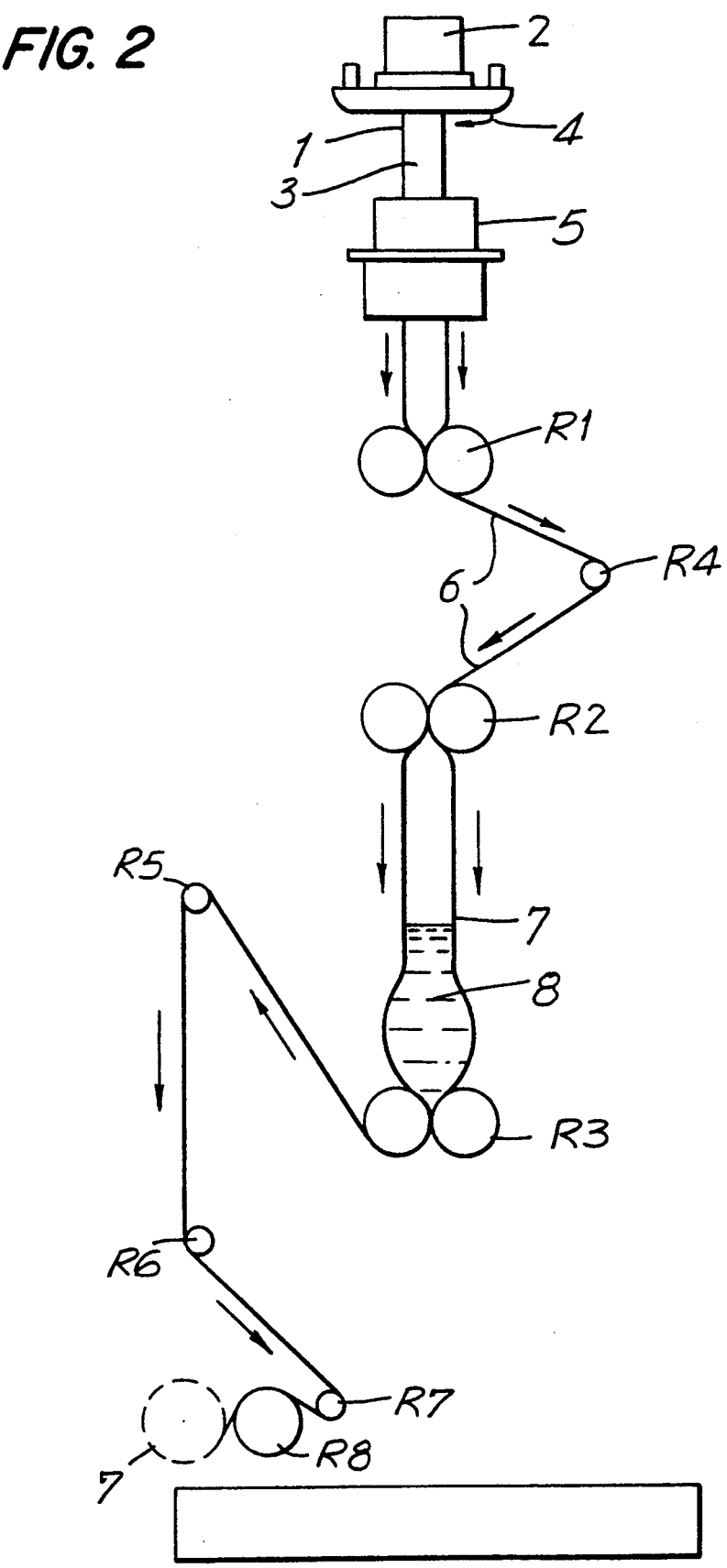
FIG. 2 is a diagrammatic illustration of the method and apparatus for stretching plastics film according to the present invention.
Figure 3:
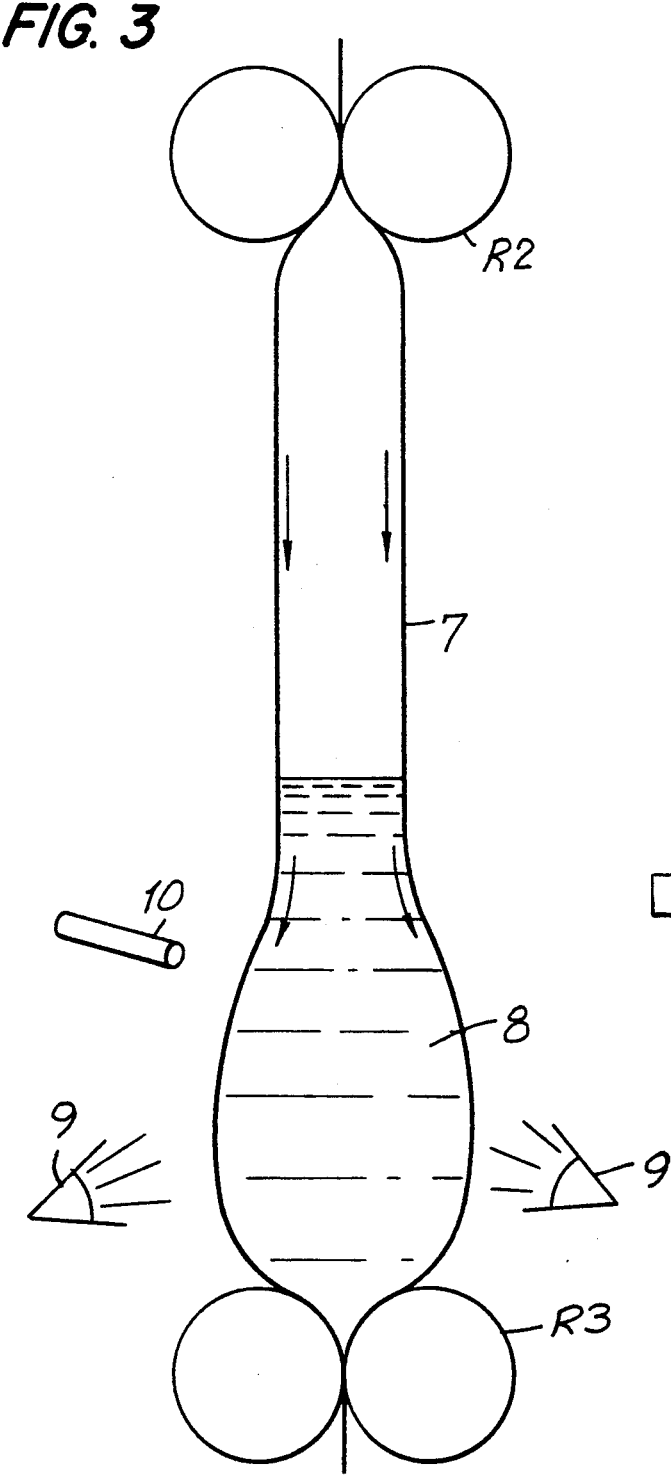
FIGS. 3 and 3A are an enlarged diagrammatic view, more clearly illustrating the stretching of plastics film by the use of a liquid hydraulic mass; and, FIG. 4 is a diagrammatic view corresponding with FIG. 3, but taken in a vertical plane perpendicular to the vertical plane of FIG. 3.
Figure 3A:
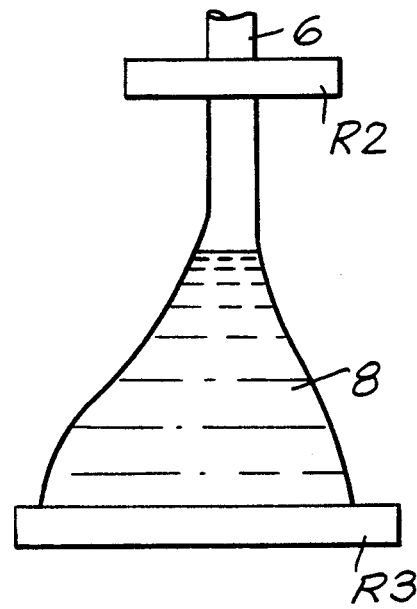
Figure 4:
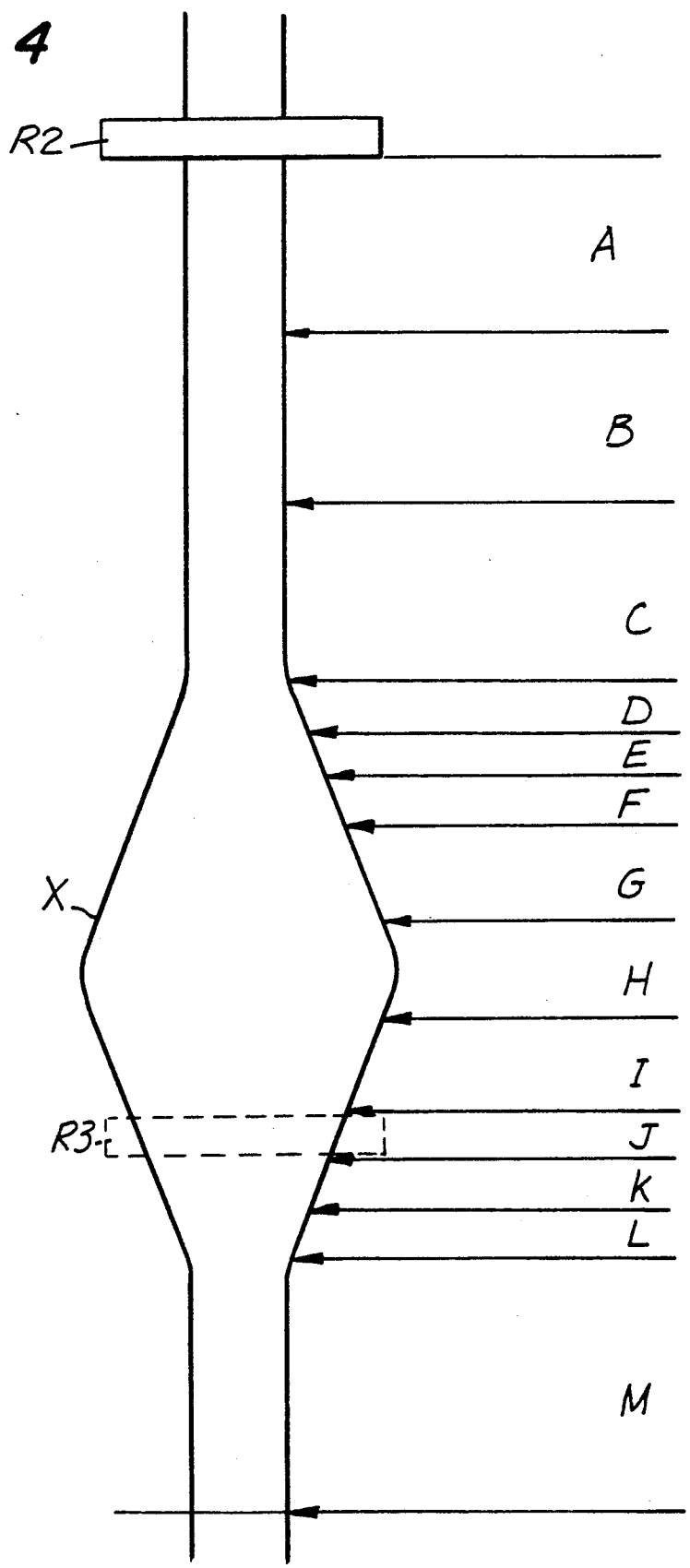

Referring now to FIGS. 2-4, the extrusion or coextrusion die 2 used for extruding the hollow tube of plastics material, instead of being floor mounted is mounted in an elevated location, and, is inverted so that the extruded tube emerges in a vertically downward direction, and, continues in a vertically downward path throughout the entire stretching operation, as indicated by the arrows in FIG. 2.

Immediately upon leaving the die 2, the upper portion 1 of the hollow tube 3 emerging from the extrusion die 2 is chilled, subsequent to which the tube 3 is temperature conditioned in a chilling device 5. The chilling device 5 can be in the form of an annular water tank through which the tube 3 proceeds in sealed relation, the tube 3 when reaching the upper pair of pinch rolls R1 being at a temperature above its glass transition temperature and amorphous and free of crystallinity to the greatest possible extent.

The emerging tube of plastics material in flattened form is then passed over a tensioning roller R4, and passes to the nip of a lower pair of pinch rollers R2.

The pinch rollers R1 and the pinch rollers R2 can be driven at speeds different from each other, the speed of the pinch rollers R2 being the higher. In this manner, an initial axial stretch is imparted to the tube of plastics material, before it proceeds to the lateral blowing step.

Upon emerging from the nip of the lower pair of pinch rollers R2, the hollow plastics tube then proceeds downwardly to the nip of a lower most pair of pinch rollers R3, which are driven at a higher speed than the pinch rollers R2 in order to produce a further axial stretch in the tube of plastics materials.

Upon leaving the nip of the pinch rollers R3, the stretched plastics material passes over tensioning rollers R5, R6 and R7 and is reeled at R8 into a continuous coil.

Prior to the reeling of the stretched film of plastics material, it can be axially slit, and then reeled in flattened form.

The lateral stretching of the plastics material takes place at a location between the pinch rollers R2 and the pinch rollers R3, in which it is formed into a laterally expanded bubble of the plastics material.

The manner of expanding the plastics material into the bubble 7 will now be described with reference to FIGS. 3 and 4.

As opposed to the conventional air blowing of the bubble 7, the stretching of the plastics material is effected exclusively under the influence of the static and dynamic pressure of a stable liquid hydraulic mass. The liquid hydraulic mass 8 is introduced into the interior of the hollow tube, and, the volume and thus weight and the temperature of the hydraulic mass is controlled to maintain the hydraulic mass 8 at constant temperature and also constant volume and weight during a production run of the stretched plastics film.

The hydraulic mass 8 is prevented from leaking out of the interior the hollow plastics tube by the pressure exerted at the nip of the rollers R3, which act to squeeze liquid material attempting to enter the nip of those rollers back into the body of the hydraulic mass 8.

The liquid hydraulic mass 8 is one that remains in the liquid phase at all temperatures encountered during the lateral stretching of the hollow cylinder of plastics material, to the exclusion of vaporization of the hydraulic mass, and preferably is a volume of water, or, water admixed with soluble materials compatible with the plastics material that is being stretched. It can, however, be a mass of any other suitable liquid.

The lateral or radial expansion forces exerted by the hydraulic mass 8 on the plastics material is self-regulating, in that any increased resistance to stretching of the plastics material will result in an upward elongation of the contained hydraulic mass, with a consequential increase in the static pressure at the lower portion of the hydraulic mass. Similarly, any decrease in resistance to stretching of the plastics film will result in a lowering of the pressure head of the hydraulic mass, and, a lowering of the static pressure at the bottom of the mass.

Further, as the plastics film is moving in a single direction relative to the hydraulic mass, the plastics film itself will induce eddy currents within the liquid hydraulic mass to produce continuous intermixing of the hydraulic mass.

As further illustrated in FIG. 3, the temperature of the hydraulic mass 8 can be controlled by the use of an infrared temperature sensor 10, which is employed in a conventional manner to energize infrared emitters 9 positioned to heat the hydraulic mass by radiation.

As will be apparent from consideration of FIGS. 3 and 4, the stretching of the plastics film and the confinement of the stretched plastics film between the pinch rollers R3 will result in a progressive elongation of the bubble in the direction of the axis of the rollers R3, i.e., the tube of plastics material during its lateral stressing will move through transverse cross-sections proceeding from circular to elliptical and then to flat, the minor axis of the ellipse being zero in the flattened condition and the major axis being at the selected maximum when in that condition.

By use of the present invention, the lateral stretching of the film can be accurately controlled by controlling the weight and the volume of the hydraulic mass, and, it can be changed or adjusted during the stretching operation by decreasing the volume of the hydraulic mass by permitting a portion of the hydraulic mass to exhaust between the nip of the pinch rollers 3, or, the volume of the hydraulic mass can be increased by permitting a further volume of the hydraulic mass to enter through the pinch of the nip rollers R2.

By the method of the present invention mechanically conditioned thermoplastics film can be produced having bi-axially recoverable stress, by the following steps:

A) Continuous production of a thermoplastic in tubular form (1) through an injector and corresponding die (2), where said produced tube is developed vertically and in a descending manner, said tube comprising one or more layers, monoextruded or coextruded with several types of thermoplastic materials, so that said tube (1) may show several layers, which may be completely different among themselves or combine equal layer groups, so that the produced tube may show characteristics of different thermoplastic materials;

B) Immediately under the die (2) the formed bubble (3) is cooled through a chilled air flow (4), after which the tubular thermoplastic material passes through a refrigerating guide ring (5);

C) Application of quenching at the plastic tube wall (1) immediately after cooling with chilled air, through use of a continuous flow of refrigerating liquid also forming a thin tubular film involving completely the material in process int he cooling guide ring;

D) Collapse or flattening of the plastic tube (1) through a first pair of pulling rollers (R1) followed by two other pairs (R2) and (R3); between (R1) and (R2) the flattened plastic film is laterally deflected by a tensioning regulating roller (R4), defining there a large deflection angle, passing then through the pulling roller pairs (R2) and (R3), where the second one may have a rotation speed equal to or larger than the first one (R2), in order to cause longitudinal stretching of the film being processed;

E) Placement of hydraulic mass (6) inside the flattened tube, exactly at the stretch comprised by rollers (R2) and (R3), so that said hydraulic mass is normally kept supported against or on the lower roller pair (R3) and, at this point, a divergent forces effect is produced, i.e., the higher the descending speed of the plastic tube, the larger will be the pressure of the hydraulic mass on the lower roller pair, where the formed barrier causes a regular and uniform expansion of the hydraulic mass base, resulting in a tri-dimensional stretching of the plastic tube, thus characterizing a suitable orientation of said tube in the longitudinal and transversal direction;

F) After roller (R3) the flattened tube, already stretched in the transversal and longitudinal direction passes through other rollers (R5) to (R8), where a large involving angle is also defined and, further, a compensation is performed, in order to enable the processed film to be wound up on a suitable spool (7).

It becomes clear that the objective of this continuous process is to prepare a film with one sole layer or with several layers with different characteristics referring to their biaxial orientation and, thus, the different layers may compose a film combining the characteristics of different thermoplastic materials, in order to produce a shrinkable product to meet different utilization requirements.

The quenching performed inside ring (5) is done preferably at a temperature of 2 degrees Celsius, but not necessarily, depending on the polymers being processed.

The cooling liquid for the performance of said quenching is preferably a continuous flow of water chilled to 2 degrees Celsius forming a thin continuous film involving the extruded tube, making it completely amorphous.

The cooling guide ring (5) is also used to calibrate the bubble diameter and is also at a preferred temperature of 2 degrees Celsius.

Between (R1) and (R2) the already cooled extruded tube is kept at a stable stress.

The biaxial orientation of the flattened tube is performed at ambient temperature between rollers (R2) and (R3).

The longitudinal orientation, i.e., in the machine direction of the flattened tube is obtained by increasing the rotation speed of the roller pair (R3) in relation to rollers (R2), so that said speed difference may cause hydrostretching of the flattened tube being processed, with the stretching percentage proportional to the speed difference between (R2) and (R3).

The hydraulic mass (6) is preferably a certain quantity of water at ambient temperature, but not necessarily, whose volume may change very much, depending on the diameter of the tube to be oriented and on the characteristics of the processed thermoplastic material.

The hydraulic mass is characterized by presenting itself as a divergent forces generator, which are applied against the tubular wall of the thermoplastic material in process, thus causing its transversal hydrostretching. This hydrostretching is a function of the water volume, speed differential between rollers (R2) and (R3), temperature of the cooling liquid.

This invention also enables the hydraulic mass preferably composed of water at ambient temperature to be heated, or composed or any other liquid with a viscosity or temperature more suited to the polymers being processed, and that remains in the liquid phase at a temperatures encountered during the stretching step.

Also, the extruded tube containing the hydraulic mass may be immersed in a tank containing another liquid with controllable volume and temperature, for hydrostretching to occur through the difference between the inner hydraulic pressure of the bubble and the outer pressure.

All arrangements always aim to meet the same basic principle of causing a controllable hydrostretching at low temperature, said temperature to be much lower than the crystallization temperature and as near as possible to the glass-transition temperature, thus working on the amorphous polymer and generating the largest possible contraction. Under these conditions, the largest ratio between speeds (R2) and (R3) is obtained, as well as the largest ratio between the diameters of the original tube and of the stretched tube.

In the conventional processes with gas or air in which deformation is obtained at high temperatures known as orientation range and immediately below the crystallization temperature at which the bubble is inflated with gas, which has the characteristics of filling the determined volume and that of being compressible, biaxial deformation is caused by the gas internal pressure and, under equilibrium, is equal to the expected deformation. Thus, a whole deformed bubble is obtained, which is subject to oscillations of the internal pressure due to irregular distribution of the preheating temperature, gas convection internal currents through heat exchange with the bubble itself, etc.

Differing from this process, hydrodeformation is performed in a short period of time and through small recoverable and increasing elastic deformations, with freezing of the molecular structure aligned in each step of this deformation, since it is a deformation at cold temperature.

It may be noticed, after the description and illustration, that this is a process for the manufacturing of a mechanically conditioned thermoplastic film with biaxially recoverable stresses where the biaxial orientation step does not require reheating of the thermoplastic material as well as eliminating the use of an air bubble, occurring in a short descending vertical process, thus being a more efficient way of biaxially orienting the processed thermoplastic material tube, also with the advantages mentioned before in relation to the hydraulic mass since it enables a better stretching control.

It will also be appreciated that by adjusting the specific gravity of the hydraulic mass, further control can be obtained over the hydrostatic pressure existing at the bottom of the mass. Further, it will also be appreciated that by increasing the viscosity of the hydraulic mass the static pressure at the bottom of the mass also can be controlled, in this case by the pull down of the hydraulic mass by the progressively downwardly descending film of plastics material.

FIG. 4 shows schematically a stretch of a tubular film processed according to this invention, highlighting its dimensional variations regarding stretchings TD and MD. This figure, jointly with the table below, shows a SUMMARIZED PROFILE of coextrusion of a three-layer structure, "COPOLYAMIDE, ADHESIVE AND IONOMER", defining a tubular film with an INITIAL thickness "A" of 140 microns: COPOLYAMIDE=86 microns, ADHESIVE=11 microns and IONOMER=43 microns. After processing, this same structure had a final thickness "N" of 55 microns: POLYAMIDE=33 microns, ADHESIVE=6 microns and IONOMER=16 microns; also between these thicknesses several other dimensional variations appeared, including the biaxial stretching as shown in the table below.

|  | ZONE | WIDTH (in cm) | THICKNESS (in micra) | CONTRACTION IN % MEASURED AT 90° C. (−) CONTRACTION (+) EXPANSION MD | TD |
|---|---|---|---|---|---|
| Monoaxial | A | 17,0 | 140,0 | −12 | +05 |
| stretching | B | 16,5 | 135,0 | −15 | +07 |
|  | C | 16,0 | 130,0 | −20 | +09 |
| Biaxial | D | 17,0 | 125,0 | −18 | +03 |
| Stretching | E | 19,0 | 110,0 | −18 | +00 |
| TD/MD | F | 28,0 | 75,0 | −25 | −25 |
|  | G | 39,0 | 50,0 | −33 | −37 |
|  | H | 45,0 | 40,0 | −36 | −46 |
|  | I | 39,0 | 40,0 | −45 | −49 |
| Retraction | J | 35,0 | 40,0 | −45 | −37 |
|  | K | 33,0 | 55,0 | −35 | −36 |
|  | L | 28,0 | 55,0 | −40 | −30 |
| Stabilization | M | 26,0 | 55,0 | −40 | −22 |

Normally the ratio between the rotations of R3/R2 is of about 2 to 4; however, tests show the possibility of working with ratios of 1/1 to 1/16. The ratio between the WIDTHS of ZONES A and M is normally between 1/1.5 and 1/2.5; however, tests show the possibility of a ratio of 1/1 to 1/5. It is important to note that through this process, contraction results are obtained which are larger than traditional processes with smaller stretching rates TD or MD. It should be noticed also that the ratio between the initial thickness (zone A) and the final one (zone M) (desired), is relatively small as compared with the traditional processes; in the mentioned example the value of this ratio is of approximately 2.5.

The adjustments of the percentage contraction values are made by the ratio between the following variables: INITIAL THICKNESS "ZONE a", LIQUID VOLUME "BETWEEN ZONES D and I" and RELATIVE SPEED BETWEEN ROLLERS R3 and R2.

It should be noted that the energy used to obtain the film deformation is substantially less than in the non-processes with gas or air.

What we claim is:

1. A process of producing stretched thermo-shrinkable oriented or conditioned thermoplastics film, including the steps of:

providing a continuous hollow cylinder of thermoplastics material in a substantially amorphous non-crystalline state and at a temperature above the glass transition temperature of said material;

traversing said hollow cylinder exclusively in a substantially vertical downwards direction between respective pairs of pinch rolls positioned vertically one above the other;

inserting a mass of liquid material into said continuous hollow cylinder at a location above the nip of a lowermost air of said pinch rolls, and causing said cylinder of thermoplastics material to stretch laterally exclusively under the influence of the progressively increasing static and dynamic hydraulic pressure produced by said hydraulic mass in a downwards direction; said mass of liquid material being one that remains in the liquid phase at all temperatures encountered during the step of lateral stretching of said hollow cylinder, to the exclusion of vaporization of said mass; and, while retaining said hydraulic mass trapped within said hollow cylinder, traversing said hollow cylinder of substantially amorphous thermoplastics material downwardly exclusively in a downwards direction between said respective pairs of pinch rolls to form stretched plastics film exclusively under the influence of said progressively increasing said static and dynamic hydraulic pressure produced by said hydraulic mass in said downwards direction.

2. The process of claim 1, including the further steps of:

continuous extruding said hollow cylinder of plastics material;

cooling said cylinder by a chilled air flow;

immediately quenching said extruded cylinder while still in an amorphous state to the lowest possible temperature above its glass transition temperature by using a continuous flow of refrigerant liquid providing a liquid film surrounding said cylinder;

subsequently stretching said cylinder while in its substantially amorphous state in lateral directions by means of the static pressure produced by said hydraulic mass.

3. The process of claim 1, in which said cylinder is traversed in a truly vertical direction.

4. The process of claim 1, in which the cylinder is traversed at a minor angle to a truly vertical direction.

5. The process of claim 1, including the further steps of temperature controlling said hydraulic mass by infrared radiation transmitted through the wall of said cylinder.

6. The process of claim 1, including the further steps of controlling the volume of said hydraulic mass by releasing a portion of said hydraulic mass through the nip of the lowermost pair of pinch rolls.

7. The process of claim 1, including the step of increasing the volume of said hydraulic mass by introducing further said liquid hydraulic material through the nip of said uppermost pair of pinch rolls.

8. The process of claim 1, including the step of introducing said mass of liquid material through a center opening in an extrusion die employed for producing said hollow cylinder.

9. The process of claim 1, including the further step of inducing eddy currents within said liquid hydraulic mass by utilizing the frictional force of said thermoplastics material as it traverses the external surface of said hydraulic mass.

10. The process of claim 1, including the further steps of providing plural said annular hollow cylinders of thermoplastics material of different characteristics and in concentric arrangement by the use of a coextrusion die, and, laterally stretching said composite hollow tube by the static pressure of said hydraulic mass to provide a composite expanded thermoplastics film having multiple layers of characteristics different one from the other.

11. The process of claim 1, including the further steps of:
preconditioning said hollow cylinder by passing it through the nip of a further pair of pinch rolls in advance of the uppermost pair of pinch rolls to flatten said hollow cylinder; and,
deflecting said flattened hollow cylinder laterally by passing it over a tension regulating roller;
said uppermost pair of pinch rolls being driven at a speed higher than said further pair of pinch rolls to impart longitudinal pre-stretching of said plastics material.

12. The process of claim 1, including the further steps of:
passing said longitudinally and axially stretched plastics film emerging from the lowermost pair of pinch rollers over guide rolls providing a large lateral deflection angle, said guide rolls being driven at a speed less than said lowermost pinch rolls to permit longitudinal contraction of said stretched film prior to the winding of said stretched film on a winding device.

13. The process of claim 2, in which said quenching is performed in a water ring providing a calibration orifice for said hollow cylinder of plastics material.

14. The process of claim 10, including the further steps of:
preconditioning said hollow cylinder by passing it through the nip of a further pair of pinch rolls in advance of said uppermost pair of pinch rolls to flatten said hollow cylinder; and,
deflecting said flattened hollow cylinder laterally by passing it over a tension regulating roller;
said uppermost pair of pinch rolls being driven at a speed higher than said further pair of pinch rolls to impart longitudinal pre-stretching to said plastics material.

15. The process of claim 10, including the further steps of: passing said longitudinally and axially stretched plastics film emerging from the lowermost pair of pinch rollers over guide rolls producing a large lateral deflection angle, said guide rolls being driven at a speed less than said lowermost pinch rolls to permit longitudinal contraction of said stretched film prior to the winding of said stretched film on a winding device.

16. The process of claim 10, in which said hydraulic mass is a liquid of selected temperature and viscosity related to the plastics material to be stretched.

17. The process of claim 10, in which said hollow cylindrical tube of plastics material containing said hydraulic mass is emersed in a tank containing another liquid of controlled volume and temperature, whereby said hydrostretching occurs as a consequence of the differential between the inner hydraulic pressure exerted by said hydraulic mass and the outer hydraulic pressure exerted by said liquid in said tank.

* * * * *